(No Model.)

H. M. APPLEGATE.
SHACKLE FOR WAGON SHAFTS.

No. 573,633. Patented Dec. 22, 1896.

WITNESSES
Edmund A. Strauss
J. L. Tappan

INVENTOR,
Hugh M. Applegate
by John Wedderburn
Attorney

THE NORRIS PETERS CO., PHOTO-LITHO., WASHINGTON, D. C.

United States Patent Office.

HUGH M. APPLEGATE, OF UNIONVILLE, MISSOURI.

SHACKLE FOR WAGON-SHAFTS.

SPECIFICATION forming part of Letters Patent No. 573,633, dated December 22, 1896.

Application filed August 24, 1896. Serial No. 603,706. (No model.)

*To all whom it may concern:*

Be it known that I, HUGH M. APPLEGATE, a citizen of the United States, residing at Unionville, in the county of Putnam and State of Missouri, have invented certain new and useful Improvements in Nuts and Shackles; and I do hereby declare the following to be a full, clear, and exact description of the invention, such as will enable others skilled in the art to which it appertains to make and use the same.

My invention relates to improvements in shackles for attaching carriage or wagon shafts in position to throw the carriage either to one side or the other of the horse, as desired.

The invention comprises an arm provided at one end with a nut adapted to be screwed upon the end of the forward axle and at the other end with thill-attaching lugs.

The invention also consists of certain other novel constructions and arrangements of parts, all of which will be hereinafter more particularly set forth and claimed.

Figure 1:
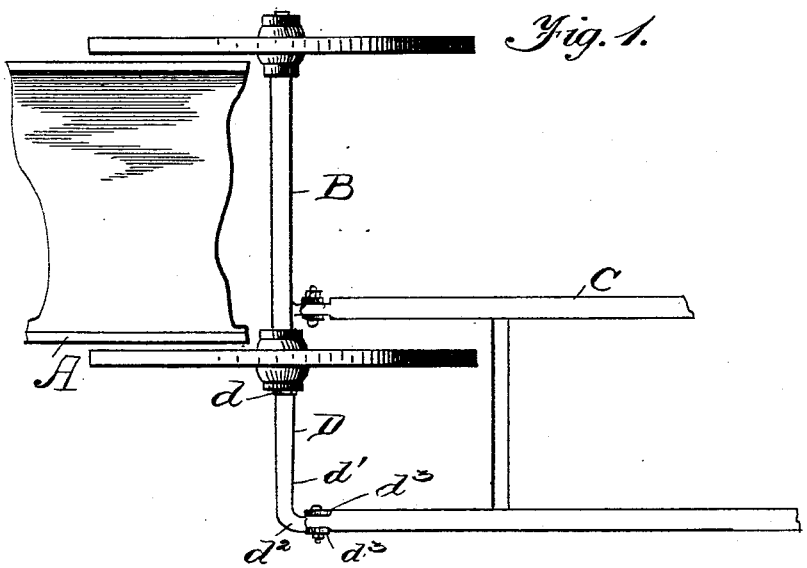
Figure 2:
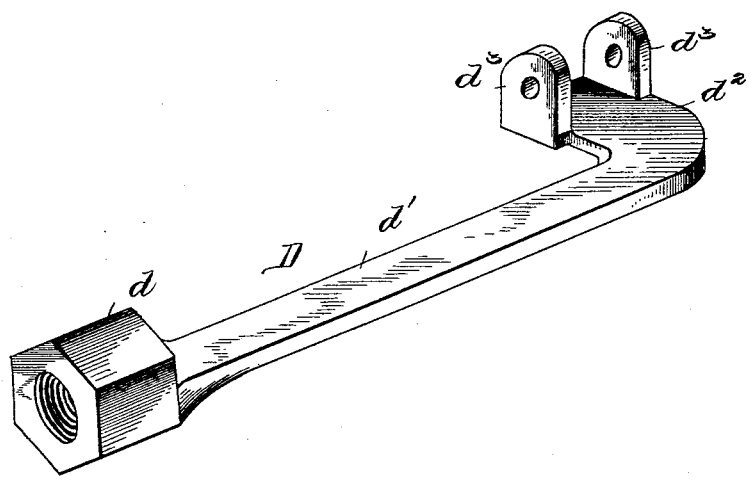

In the accompanying drawings, forming part of this specification, Figure 1 represents a top plan view of a vehicle with my invention applied thereto, a portion of the body of the same being broken away to expose the attachment of the inner end of one shaft to the forward axle. Fig. 2 represents a detail perspective view of my said improved shackle.

A in the drawings represents the body of the wagon; B, the forward axle; C, the shafts, and D my improved shackle-iron. This iron comprises a nut $d$, having an integral arm $d'$ extending from its outer end. The outer end of this arm is extended forward, as at $d^2$, and provided at said forward end with two apertured lugs $d^3$, between which the thill-iron $c$ is adapted to be secured.

In attaching my improved shackle to a wagon or carriage the nut on one end of the axle B is removed and the shackle screwed on in its place, with the arm $d^2$ extending forward to receive the thill-iron upon the side of the wagon. In some cases the thill-iron may have to be lengthened to permit it to reach far enough back to engage the shackle-screw upon the end of the axle, as the distance in some wagons between the forward axle and the front of the wagon is sufficient to require this extension of the said iron. If the shackle has been applied upon the left-hand end of the axle, the right-hand shackle of the axle will have to be moved over, so as to be in position to receive the right-hand thill-iron. The shafts will now straddle the left wheel and throw the horse forward of the left wheel to the desired degree, thus permitting the horse to run within the beaten track and at the same time not interfering with the running of the wagon or carriage in the proper track.

It will be observed from the above that the application of my shackle to a carriage or wagon requires only the removal of one of the axle-nuts and the application of said shackle in lieu thereof, the shackle answering the twofold purpose of securing the wheel in position and affording a support for the thill-iron upon this side of the carriage or wagon. This device is preferably cast-steel or rough iron, all in one piece, and being of very simple construction will cost very little to manufacture.

Having now described my invention, what I claim as new, and desire to secure by Letters Patent, is—

1. A shackle-iron for carriages and wagons comprising a nut and arm extending from the same, and apertured lugs formed upon said arms for receiving the thill-arm, substantially as described.

2. In a shackle-iron for carriages and wagons the combination with a nut of an arm extending laterally and forwardly from the same and apertured upright lugs formed upon the outer end of said arm and adapted to receive the thill-iron.

In testimony whereof I have signed this specification in the presence of two subscribing witnesses.

HUGH M. APPLEGATE.

Witnesses:
 NEAL B. MARSHALL,
 TRUSTEN HART.